Figure 1:
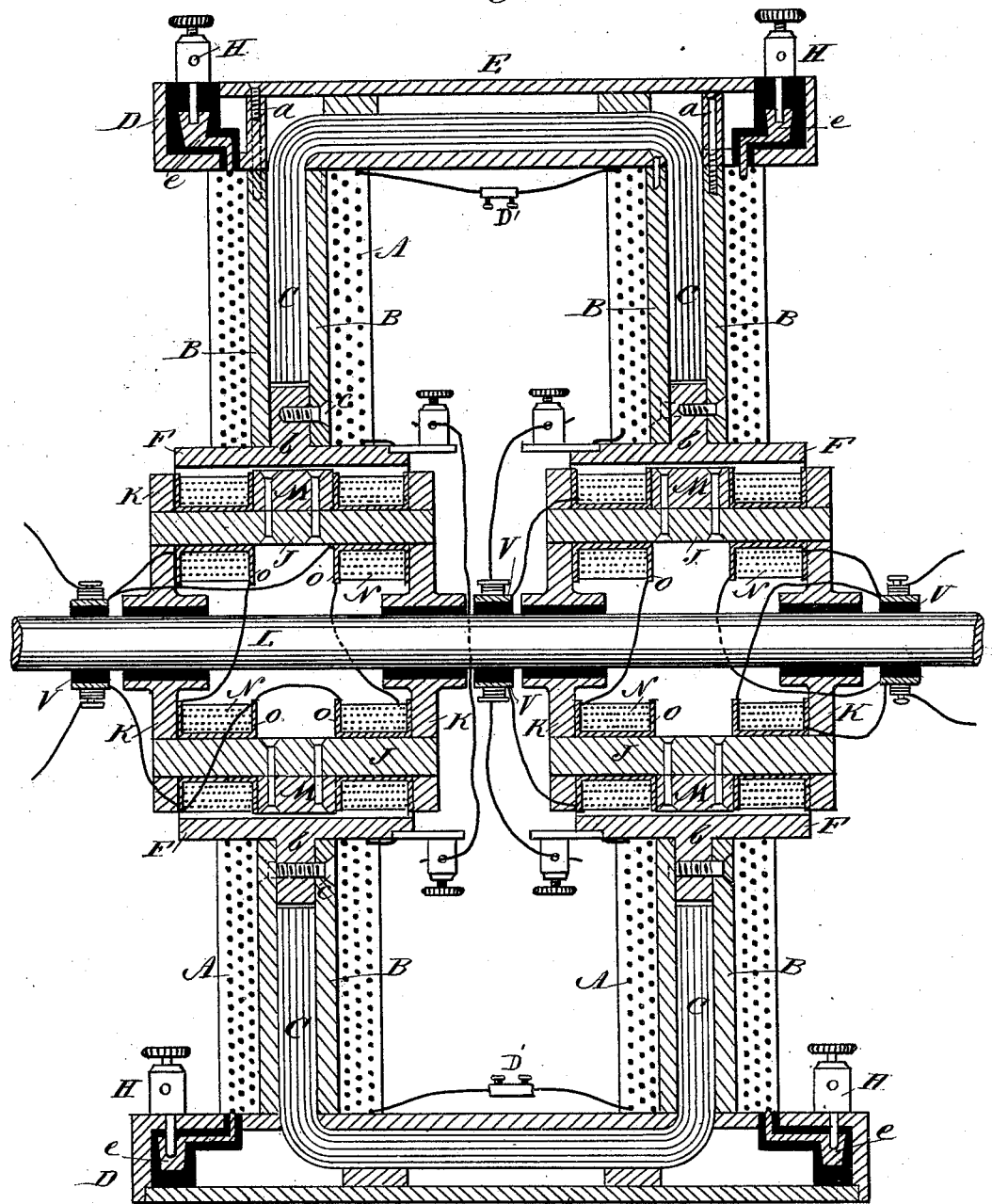

(Model.)

3 Sheets—Sheet 1.

J. V. CÁPEK.
DYNAMO ELECTRIC MACHINE.

No. 247,883.   Patented Oct. 4, 1881.

WITNESSES:
C. Neveux
C. Sedgwick

INVENTOR:
J. V. Cápek
BY
ATTORNEYS.

(Model.)
3 Sheets—Sheet 2.
J. V. CÁPEK.
DYNAMO ELECTRIC MACHINE.
No. 247,883. Patented Oct. 4, 1881.
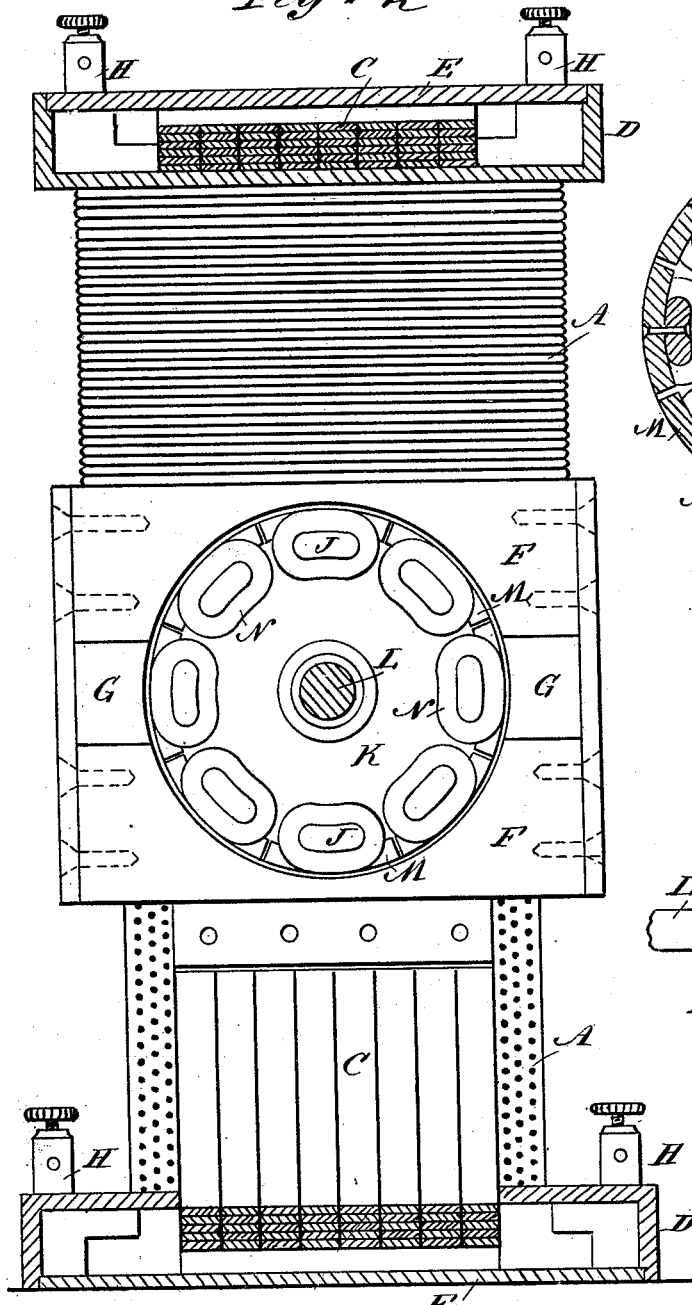
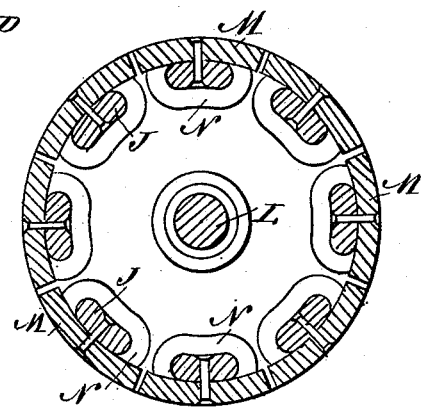
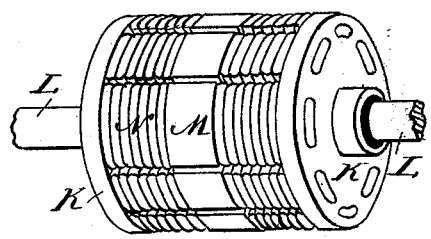
WITNESSES:
C. Neveux
C. Sedgwick
INVENTOR:
J. V. Cápek
BY Munn & Co.
ATTORNEYS.

(Model.) 3 Sheets—Sheet 3.
J. V. CÁPEK.
DYNAMO ELECTRIC MACHINE.
No. 247,883. Patented Oct. 4, 1881.
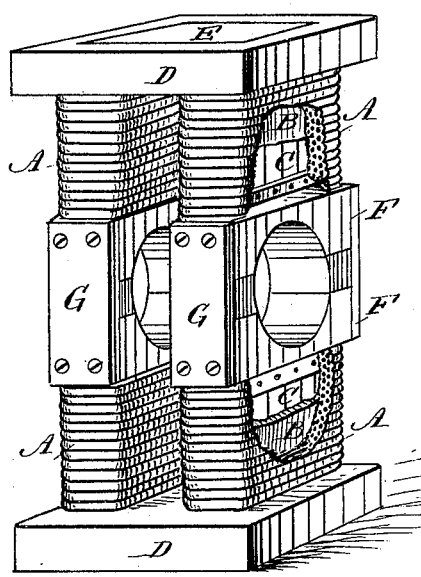
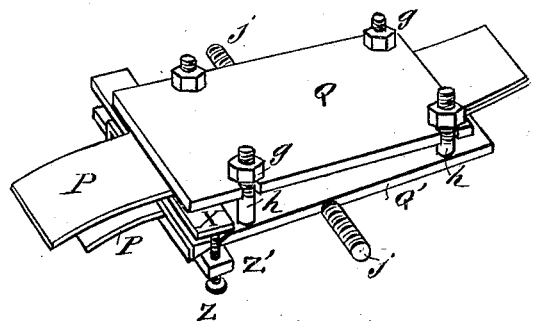
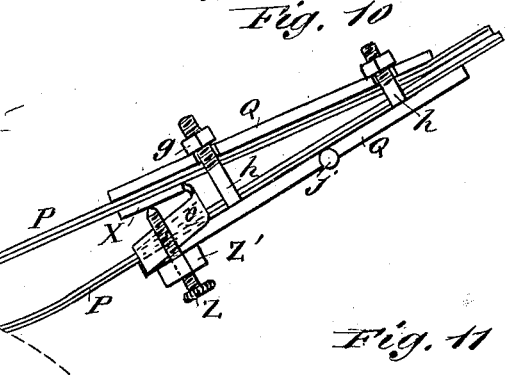
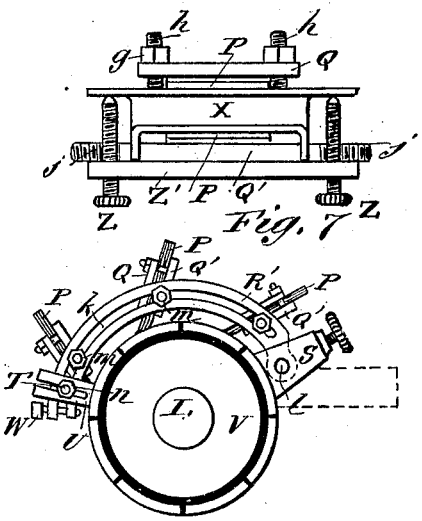
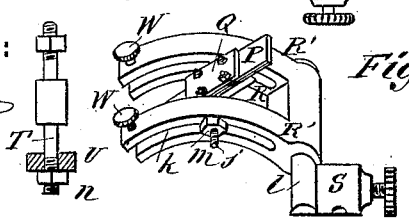
WITNESSES:
C. Neveux
C. Sedgwick
INVENTOR:
J. V. Cápek
BY Munn & Co.
ATTORNEYS.
N. PETERS, Photo-Lithographer, Washington, D. C.

UNITED STATES PATENT OFFICE.

JOHN V. CÂPEK, OF BROOKLYN, E. D., NEW YORK.

DYNAMO-ELECTRIC MACHINE.

SPECIFICATION forming part of Letters Patent No. 247,883, dated October 4, 1881.

Application filed April 27, 1881. (Model.)

*To all whom it may concern:*

Be it known that I, JOHN V. CÂPEK, of Brooklyn, E. D., in the county of Kings and State of New York, have invented a new and Improved Dynamo-Electric Machine, of which the following is a specification.

The object of my invention is to provide a new and improved dynamo-electric machine which is simple in construction, can be easily repaired or adjusted, and operates very advantageously.

The invention consists in a dynamo-electric machine having the field-magnets formed of removable U-shaped iron cores fitting in plate-iron casings, in the ends of which the concave magnet-heads surrounding the armature, and connected by non-magnetic plates, are inserted, and which casings are surrounded by several layers of wires, the ends of each layer being connected with a plate, uniting the two coils in such a manner that all or any number of layers can be included in the circuit—that is to say, the wire or line of the exciting-current can be so connected that more or less layers of wire are excited.

The invention further consists in an armature formed of a series of U-magnets attached to circular soft-iron disks, and provided with segmental plates integral therewith or riveted thereto, and projecting from the middle of the outer surfaces of the magnets, where they are united, on each side of which central segmental plates the coils are wound, these coils being wound around sheet-iron casings, which are slipped on the magnets.

The invention further consists in brush-holders formed of two forked segmental arms united at one end and mounted loosely on pintles, between which pairs of arms the brushes are clamped between two plates provided with pins passing between the forked arms, and secured by nuts, these arms being provided at the outer end with a transverse rod fitting in a fork on the commutator, whereby the pressure of the brushes can be regulated.

The invention further consists in a spring-plate in the ends of the brush-holding clamp-plates, and set-screws for drawing them together and separating them, whereby the length of the part of the brushes resting on the commutator can be regulated.

The invention also consists in the construction of details, which will be fully described hereinafter.

In the accompanying drawings, Figure 1 is a longitudinal sectional elevation of my improved dynamo-electric machine. Fig. 2 is an end elevation of the same, showing an end sectional view of the armature, and showing the lower field-magnet in section. Fig. 3 is a central cross-sectional elevation of the armature. Fig. 4 is a perspective view of the armature. Fig. 5 is a perspective view of the field-magnets, parts being broken out to show the construction. Fig. 6 is a diagram showing the connections of the several layers of wire of the field-magnets. Fig. 7 is a side elevation of my improved brush-holder. Fig. 8 is a perspective view of my improved brush-clamp holder and an end view of the same. Fig. 9 is a perspective view of my improved brush-clamp. Fig. 10 is a longitudinal elevation of the same. Fig. 11 is an end elevation of the same.

Similar letters of reference indicate corresponding parts.

There are two sets of field-magnets, the opposite poles facing each other. These field-magnets are formed of several layers, A, of wire surrounding a casing formed of two iron plates, B B, separated a distance equal to the thickness of the cores C C, which are fo c (according to the work the machine is intended for) of a single soft-iron bar bent in the shape of a U, or of several bundles of steel or iron wire, or of plates bent in the shape of a U, which core is inserted in the casing formed by the plates B B and the wires surrounding them, as is shown in Figs. 1 and 5. These plates are united at the outer ends by a box, casing, or hollow or recessed iron plate, D, provided with slots for the shanks of the U-shaped magnet-cores C to pass through, and with a cover, E, which is secured to the outer plates, B, by means of screws $a$, so that this core C can be removed without taking the machine apart, all that is necessary being to remove the cover or lid E. The magnet-heads F are provided with a projection or lug, $b$, fitting in between the lower ends of the plates B B, and secured to the same by the screws $c$, these heads F having concave opposite surfaces, so that when two opposite magnet-heads are united by means of brass plates G, or by means of insulated iron plates, the inner surfaces of which are made segmental with the same radius as the inner surfaces of the magnet-heads, a complete circle will be formed between the opposite magnets, in which the armature rotates. These magnet-heads may have the width of the magnet-cores and the surrounding plates only, so as to present a concentrated and intense magnetic field to the armature-poles, or they may be made of such width as to embrace the armature and the coils, as shown in Fig. 1.

Referring to diagram shown in Fig. 6, the insulated wire of the field-magnet is wound in the following manner: The wire is wound around the plates B B in the ordinary manner, and the first layer connected at *d* in the ordinary manner. After each layer is completed the wire is denuded and soldered to a small metallic cone or block, *e*, with an aperture, *f*, in the outer end, into which aperture a binding-post, H, can be inserted. These cones *e* are arranged in the end plates, D, and in the magnet-heads F, and are well insulated from both. Four binding-posts are used—two for the plate D and one for each magnet-head (for each combined or U-shaped field-magnet)—and the conductors for the exciting-current are connected with these binding-posts. The layers of wire are thus alternately connected with the plate D and with the heads of the field-magnets. The magnetization can thus be regulated—that is, the exciting-current can be made to traverse all the layers of wires, part of them, or only one layer, in the following manner: If the conductors are connected with the cones *e* at 7 7 by the posts H H, as shown in the diagram, Fig. 6, the magnet-exciting or magnetizing current will pass through all the layers, or the whole length of the wire; but if the conductors would be connected with the cones *e* at 2 2, the current would pass through two layers only, &c. In this manner the current can be made to traverse three, four, five, &c., layers of wire by placing the binding-posts H in the different cones. If the posts H of the plate D are in the apertures of the cones *e* at 2 2, and are connected by a wire, and the posts H of the magnet-heads are placed in the cones *e* at 1 1, the current will pass through the layers 1 and 2 simultaneously. The wires of the upper and lower magnet-shanks are connected. I wish to state particularly that the lines of the exciting-currents are either connected with the posts H on the end plates, D, or the posts H of the magnet-heads or pole ends F.

With the above-described construction of the magnets and their cores the cores can be easily replaced or exchanged, according to the nature of the work desired. For instance, if the machine is to be used for plating or telegraphy the cores are to be made of steel. For lights they are to be made of soft iron.

The armature is formed of eight or more magnets (four and four) having common yokes consisting of soft-iron disks K, mounted on and insulated from a rotating shaft, L. The ends of the shanks or like poles of the magnets are connected—that is to say, eight iron bars, preferably of an oval section, are mounted on the disks K, which they connect, the halves of two opposite bars, J, and the disk K forming one U-magnet, and the other halves of these bars and the opposite disk, K, forming the other U-magnet. As there are eight or more such bars J, eight or more U-magnets will be formed. These armatures are so located that there will be one between each two united magnet-heads.

The armature-magnet bars J have each a segmental projection, M, attached to the middle of the outer surface, (the common pole-piece,) these projections being made integral with the magnet-bars, or they may be fastened thereon by rivets or screws. The length of these central projections M is equal to one-third of the length of the magnet-bars J, so that the coils N and the projections M will all be of the same length. The coils N are not wound directly on the magnets J at each side of the projection M, but on casings O, fitting closely on the magnet cores or bars J, and which can be slipped or mounted on these magnet-cores at each side of the projections M, for the purpose of facilitating the winding of the coil. It is to be distinctly understood that there is to be an armature formed of end disks, K, magnets J, and coils N in each ring formed of the corresponding magnet-heads F F. The advantage of providing the armature-magnets with the central projections, M, are the following: An enlarged iron pole-surface is presented to field-magnets, and the heat produced by the rapid change of polarity is distributed over a larger surface. Besides this the almost continuous ring of poles preserves uniformity of the field-magnets, which is destroyed and thrown into vibrations by armatures which present iron poles and armature-coils alternately. This causes analogous vibrations in the current, especially if the coils of the field-magnets and of the armature are in the same circuit.

Any desired even number of armatures can be arranged on one shaft, an additional pair of U field-magnets being added for each pair of armatures, and the coils of these U field-magnets being connected with each other, so that the size and power of the machine can be augmented or decreased easily and rapidly by augmenting or removing a corresponding number of field-magnets and the corresponding armatures. Two armatures, or a double armature, (which is the same thing) are required for each pair of U-shaped field-magnets, so that there will be as many armatures as there are field-magnets.

The number of field-magnets can only be augmented or decreased in pairs, and the armature-coils likewise and correspondingly.

The armature-coils can be connected in the following different manners, to wit, first, for quantity-tension, second, for full quantity, third, for full tension.

The connection for quantity-tension is the natural one, and is as follows: I connect the free terminals of the coils of one U-armature magnet to two directly-opposite strips or sections of the commutator, (the other two terminals of the coils being united.) In the same manner the free terminals of all the magnets forming one section of the armature, and in the same manner all the sections of a double armature, or of a quadruple armature, are all connected with one commutator. This is indicated on the left-hand armature-section of the double armature, as shown in Fig. 1.

For full quantity I connect the two positive terminals of the coils of one U-magnet and the two negative terminals, and then connect the couples with two opposite strips of the commutator, and so with the rest, as shown on the right-hand side of Fig. 1.

For full tension I connect the positive terminal of one coil with the negative terminal of the next coil, and connect this couple with the adjacent strip of the commutator, and so with the rest of the coils.

The current for exciting the field-magnets passes from the commutator V' to these magnets, as shown in Fig. 1. I may feed the field-magnets by the current of one section of the armature, or from an external source of electricity.

The collectors of electricity consist of compound brushes. They have the ordinary task of collecting the electricity, and besides this they are to be used to establish connections between the sections or strips of the commutator, and to cut out idle coils of the armature-magnets. Both are required when the coils are coupled for quantity or for quantity-tension. If the coils are coupled for tension, the brushes are used to cut out only. The brushes are formed of copper strips P, which are clamped between brass plates Q Q', which are held together by nuts g, screwed on the ends of threaded studs or pins h of the lower plate, Q', projecting through suitable apertures in the upper clamp-plate, Q. The lower plates, Q', are provided with lateral studs or pivots j, which pass through the slots k of the shanks R' of the segmental fork R, which is loosely mounted on a projecting arm, l, of a binding-post, S, of the frame of the machine. Nuts m are screwed on the outer ends of the pivots j, to hold the brush-clamp in the desired position. A transverse rod, T, is held in the slots k of the shanks R' of the fork R, at the outer end of the same, and the ends of this rod pass into forks U, attached to the commutator V. By means of nuts on the threaded ends of the rod T the segmental fork R can be held a greater or less distance from the commutator, and thus the pressure of the brushes on the commutator can be regulated. A screw, W, is provided at the outer end of each shank R' of the fork R, for the purpose of regulating the pressure of the two arms of the shanks of the fork R on the pivots j of the brush-clamps. A V-shaped metal plate, X, is inserted between the front ends of the brush-clamp plates Q Q', the ends o of the lower part of the plate X being bent over the edges of the lower plate, Q', to hold this plate X on the plate Q'. Screws Z pass through the bars Z' below the plate Q', and the upper plate, Q, rests on the ends of these screws. By means of these screws Z, and by means of the threaded pins h and the nuts g, the inclination of the plates Q and Q' to each other can be regulated, accordingly as a greater or less length of the brush is to rest in the commutator, for if the plates are parallel, or almost so, only a small part of the brush will rest on the commutator, but if the ends of the plates are separated, a greater length of the brush will rest on the commutator. This is necessary if a large commutator is used.

There are two brush-holding segmental forks for each commutator. Two, three, or more brushes are held on each brush-holder, according to the number and width of the commutator-strips. For a tension-connection of the armature-coils two brushes in each holder are sufficient, independent of the number of strips of the commutator. For quantity or quantity-tension connections for commutators ranging from eight strips upward three or four brushes in each holder will be required for establishing proper connections. Two opposite coils of one U magnet of the armature will always be out of the field of magnetism—that is to say, in the neutral line between the two opposite poles— and in consequence of this two sections of the commutator will always be idle, and two brushes less than the number of magnets or commutator-sections be required to operate the machine. It is a known fact that coils in this position are more of a resistance than of assistance, and their exclusion is an improvement in the machine. If the armature-coils are connected for tension, I cut these obnoxious coils out by inserting the brushes in each holder in such a manner that one brush will touch the commutator before and near the neutral point in the field of one magnet, and the other a section beyond this point in the active field of the opposing magnet. By this means the sterile region between the magnets is, so to say, "over-bridged," and an ample transgress for the current is formed, and the resistance of the coils is obviated, as they are transformed into a non-obstructive shunt.

If the connection of the armature-coils is for quantity or quantity-tension, the brushes have to connect all the active sections moving through the opposite positive and negative fields in two divisions and omit the sections crossing the neutral line—that is, the brushes of the two opposite holders should be so arranged that the distance between the brushes of one holder is shorter than the width of one section or strip of the commutator, and the distance between the two nearest brushes of the two holders be greater than one section or strip of the commutator. The active coils will thus always be kept in contact, as no section or strip of the commutator belonging to them can at any moment escape a contact with the brush, and the inefficient coils never come in the reach of a brush as long as they are passing through the infertile or neutral zone.

The commutator V is of the ordinary construction, of strips of brass laid parallel on an insulated ring on the shaft, these strips corresponding in number and position with the coils of the armature.

Having thus fully described my invention, I claim as new and desire to secure by Letters Patent—

1. In a dynamo-electric machine, the field-magnets, made substantially as herein shown and described, with a core composed of removable parts, and a casing for these parts, the casing forming a recess in the magnets, as set forth.

2. In a dynamo-electric machine, the combination, with the plates B and cores C, of the slotted plate D, substantially as and for the purposes described.

3. In a dynamo-electric machine, the combination, with two wire coils, A, of the plates B, forming recesses or hollows therein, of the removable U-shaped cores C, substantially as herein shown and described, and for the purpose set forth.

4. The combination, with the wire coils A, of the plates B, the removable U-shaped cores C, and plate D, substantially as and for the purposes described.

5. In a dynamo-electric machine, the combination, with the wire coils A, of the plates B, forming recesses or hollows therein, of the removable U-shaped core C, fitting in these recesses, of the plate D, and the lid or cover E, substantially as herein shown, and for the purpose set forth.

6. In a dynamo-electric machine, the combination, with the wire coils A, of the plates B, forming recesses or hollows therein, of the removable U-shaped cores C, of the magnet-heads F, provided with segmental end surfaces, substantially as herein shown and described, and for the purpose set forth.

7. In a dynamo-electric machine, the combination, with the wire coils A, of the plates B, forming recesses or hollows therein, of the removable cores C, of the magnet-heads F, provided with projections b, fitting in between the lower ends of the plates B, substantially as herein shown and described, and for the purpose set forth.

8. The combination of two rectangular U-shaped magnets, having very flat cores facing each other, with unlike pole ends forming narrow circular fields, with two armatures revolving in the circular openings formed between the pole ends of the magnets, each in the plane of the length of two opposite cores of the two magnets, substantially as and for the purposes specified.

9. In a dynamo-electric machine, an armature made substantially as herein shown and described, and consisting of a series of U-magnets attached to two disks or disk-shaped common yokes, the opposing pole ends of the U-magnets being united, as set forth, and these disks being parts of the magnets.

10. In a dynamo-electric machine, the combination, with the disks K K, of the armature-magnet cores J, of the coils N N, and of a projection, M, of the cores on the outer surface and between the coils, substantially as herein shown and described, and for the purpose set forth.

11. In a dynamo-electric machine, the combination, with the cores J of the armature-magnets, of sheet-iron casings O, fitting on the cores, and having the wire N coiled thereon, substantially as herein shown and described, and for the purpose set forth.

12. In a dynamo-electric machine, the combination, with a brush-holder, of a series of movable brushes corresponding in number with the number of electro-magnets, and with the number of sections in the commutator, minus two, substantially as herein shown and described, and for the purpose of making connections between said sections and the terminals of the electro-magnets connected with them, substantially as set forth.

13. The combination, with the frame of the machine and the brushes, of the binding-post S, the arm $l$, the shanks R', having slots $k$, the segmental forks R, the forks U, and the thumb-screws W, substantially as and for the purposes specified.

14. In a dynamo-electric machine, the combination, with the longitudinally-slotted segmental brush-holder R, of the brush-clamping plates Q and Q' and the brushes P, substantially as herein shown and described, and for the purpose set forth.

15. In a dynamo-electric machine, the combination, with the longitudinally-slotted segmental brush-holder R, of the brush-clamping plates Q Q', the brushes P, the pivots $j$, extending through the slot $k$ of the brush-holder, and of the nuts $m$, substantially as herein shown and described, and for the purpose set forth.

16. In a dynamo-electric machine, the combination, with the brushes P, of the brush-clamping plates Q Q', of the V-shaped plates X, the pins $h$, the nuts $g$, and the screws Z Z, substantially as herein shown and described, and for the purpose of regulating the length of that part of the brush that rests on the commutator, as set forth.

17. In a dynamo-electric machine, the combination, with the brush-holder R, of the transverse rod T, the nuts $n$ or equivalents, and the forks U on the outer frame of the machine, substantially as herein shown and described, and for the purpose of regulating the pressure of the brushes on the commutator, as set forth.

18. In a dynamo-electric machine, the combination, with the longitudinally-slotted segmental brush-holding fork R, of the screws W at the ends of the same, substantially as herein shown and described, and for the purpose of regulating the pressure of the two parts of the shanks of the fork upon each other, as set forth.

19. In a dynamo-electric machine, the combination, with the wires of the field-magnets, and with the top plate, D, and heads F of the same, of a series of insulated cones or blocks, e, provided with apertures f to receive binding-posts H, these blocks being connected with each layer of wire, substantially as herein shown and described, and for the purpose of conducting the exciting-current any desired length of the wire of the field-magnet coils.

20. In a dynamo-electric machine, the combination, with each layer of the wire of the field-magnet coil, of a block or equivalent for attaching the wire of the exciting-circuit, substantially as herein shown and described, and for the purpose set forth.

JOHN V. CAPEK.

Witnesses:
OSCAR F. GUNZ,
C. SEDGWICK.